(12) United States Patent
Inoue et al.

(10) Patent No.: US 12,467,912 B2
(45) Date of Patent: Nov. 11, 2025

(54) ELEMENT ANALYSIS METHOD, ELEMENT ANALYSIS DEVICE, AND NON-TRANSITORY COMPUTER READABLE MEDIUM STORING PROGRAM FOR ELEMENT ANALYSIS DEVICE

(71) Applicant: HORIBA, LTD., Kyoto (JP)

(72) Inventors: Takahito Inoue, Kyoto (JP); Hiroshi Uchihara, Kyoto (JP)

(73) Assignee: HORIBA, LTD., Kyoto (JP)

( * ) Notice: Subject to any disclaimer, the term of this patent is extended or adjusted under 35 U.S.C. 154(b) by 518 days.

(21) Appl. No.: 17/999,784

(22) PCT Filed: Oct. 8, 2021

(86) PCT No.: PCT/JP2021/037293
§ 371 (c)(1),
(2) Date: Nov. 23, 2022

(87) PCT Pub. No.: WO2022/091748
PCT Pub. Date: May 5, 2022

(65) Prior Publication Data
US 2023/0221291 A1      Jul. 13, 2023

(30) Foreign Application Priority Data
Nov. 2, 2020    (JP) .................... 2020-183839

(51) Int. Cl.
*B01L 3/00* (2006.01)
*B01D 15/08* (2006.01)
(Continued)

(52) U.S. Cl.
CPC .............. *G01N 31/12* (2013.01); *G01N 1/44* (2013.01)

(58) Field of Classification Search
CPC ................................. G01N 31/12; G01N 1/44
See application file for complete search history.

(56) References Cited

U.S. PATENT DOCUMENTS

2004/0014234 A1    1/2004   Uchihara et al.
2019/0206667 A1    7/2019   Inoue et al.

FOREIGN PATENT DOCUMENTS

CN     102636614 A     8/2012
CN     106706543 A     5/2017
(Continued)

OTHER PUBLICATIONS

International Search Report for the corresponding patent application No. PCT/JP2021/037293 dated Dec. 21, 2021, with English translation.

(Continued)

*Primary Examiner* — Jennifer Wecker
*Assistant Examiner* — Oyeleye Alexander Alabi
(74) *Attorney, Agent, or Firm* — LUCAS & MERCANTI, LLP (57) ABSTRACT

An element analysis method is capable of maintaining accuracy of zero-point correction equivalent to that in the related art while shortening the time required for element analysis. The method includes heating a sample placed in a crucible in a heating furnace, and measuring an amount of an element contained in a gas discharged from the heating furnace by an analysis mechanism to analyze the element contained in the sample. The method includes: a blank measurement step of measuring the amount of the element contained in the gas discharged from the heating furnace when only the crucible is heated; and a step of setting an amount of zero-point correction based on a measurement value in a transient state region where the measurement value rises in blank data obtained in the blank measurement step.

12 Claims, 9 Drawing Sheets

(51) Int. Cl.
*B01F 33/302* (2022.01)
*B01F 33/3033* (2022.01)
*B01J 20/285* (2006.01)
*B01J 20/287* (2006.01)
*B01J 20/32* (2006.01)
*B01L 7/00* (2006.01)
*B01L 9/00* (2006.01)
*B65G 47/80* (2006.01)
*B82Y 20/00* (2011.01)
*B82Y 30/00* (2011.01)
*B82Y 40/00* (2011.01)
*C12M 1/34* (2006.01)
*C12M 3/06* (2006.01)
*C12N 1/14* (2006.01)
*C12N 1/20* (2006.01)
*C12Q 1/02* (2006.01)
*C12Q 1/6806* (2018.01)
*C12Q 1/6844* (2018.01)
*C12Q 1/6848* (2018.01)
*C12Q 1/686* (2018.01)
*G01N 1/44* (2006.01)
*G01N 15/10* (2024.01)
*G01N 15/14* (2024.01)
*G01N 15/1433* (2024.01)
*G01N 21/29* (2006.01)
*G01N 21/33* (2006.01)
*G01N 21/65* (2006.01)
*G01N 30/02* (2006.01)
*G01N 30/60* (2006.01)
*G01N 30/72* (2006.01)
*G01N 31/12* (2006.01)
*G01N 33/543* (2006.01)
*G01N 33/557* (2006.01)
*G01N 33/574* (2006.01)
*G01N 33/58* (2006.01)
*G01N 33/68* (2006.01)
*G01N 35/00* (2006.01)
*H05B 45/10* (2020.01)

(56) References Cited

FOREIGN PATENT DOCUMENTS

| | | | |
|---|---|---|---|
| CN | 108195880 A | 6/2018 | |
| CN | 108318306 A | 7/2018 | |
| CN | 109324081 A | 2/2019 | |
| CN | 109716481 A | 5/2019 | |
| JP | 61-274259 A | 12/1986 | |
| JP | 03-255362 A | 11/1991 | |
| JP | 05-028519 Y2 | 7/1993 | |
| JP | 07-006969 B2 | 1/1995 | |
| JP | 2745122 B2 * | 4/1998 | |
| JP | 2000-055794 A | 2/2000 | |
| JP | 2000-065699 A | 3/2000 | |
| JP | 2007-121319 A | 5/2007 | |
| JP | 2007-187579 A | 7/2007 | |
| JP | 2010-025749 A | 2/2010 | |
| JP | 4560058 B | 10/2010 | |
| JP | 2013-036992 A | 2/2013 | |
| JP | 2013-250061 A | 12/2013 | |
| JP | 2015-096811 A | 5/2015 | |
| JP | 2018-096927 A | 6/2018 | |
| WO | 2018110689 A1 | 6/2018 | |
| WO | WO-2020137147 A1 * | 7/2020 | ............ G01N 31/00 |
| WO | 2021182059 A1 | 9/2021 | |

OTHER PUBLICATIONS

European Patent Office, "Extended European Search Report" dated May 8, 2024 in connection with the related European patent application No. 21885867.8, 5 pages.

Office Action, dated Jul. 19, 2025, which was issued for the corresponding Chinese Patent Application No. 202180036185.X, 10 pages, with English translation.

Gao, W. et al., "Optimization of the method for determination of hydrogen in steel", Metallurgical Analysis, vol. 27, No. 9, Sep. 15, 2007, pp. 57-59, English Abstract.

Honma, Haruo, "Rapid Determination Method of Oxygen Contained in Organic Compounds by Means of Contact Thermal Decomposition", Bunseki Kagaku, vol. 54, No. 1, Jan. 31, 2005, pp. 57-64, English Abstract.

* cited by examiner

ELEMENT ANALYSIS METHOD, ELEMENT ANALYSIS DEVICE, AND NON-TRANSITORY COMPUTER READABLE MEDIUM STORING PROGRAM FOR ELEMENT ANALYSIS DEVICE

CROSS REFERENCE TO RELATED APPLICATION

This Application is a 371 of PCT/JP2021/037293 filed on Oct. 8, 2021, which, in turn, claims priority of Japanese Patent Application No. 2020-183839 filed on Nov. 2, 2020, and the above applications are incorporated herein by reference.

TECHNICAL FIELD

The present invention relates to an element analysis device that analyzes elements contained in a sample based on a sample gas generated by heating the sample contained in a crucible.

BACKGROUND ART

Element analysis devices are used to quantify elements such as nitrogen (N), hydrogen (H), and oxygen (O) contained in a sample (see Patent Literature 1). These element analysis devices are configured to hold a graphite crucible containing a sample with a pair of electrodes in a heating furnace to heat the crucible and the sample by applying an electric current directly to the crucible. The heating generates a sample gas that is led out from the heating furnace to the outside, and then concentration of various components is measured by an analysis mechanism including a non-dispersive infrared gas analyzer (NDIR), a thermal conductivity detector (TCD), and the like.

When the elemental analysis as described above is performed, an electric current is applied only to the crucible for a certain period of time and the crucible is heated and degassed prior to the analysis. This processing is performed to suppress generation of a gas that is not to be measured and is derived from the sample by removing atmospheric components contained in the crucible and compounds derived from nitrogen, hydrogen, and oxygen contained in the crucible itself.

Figure 9:
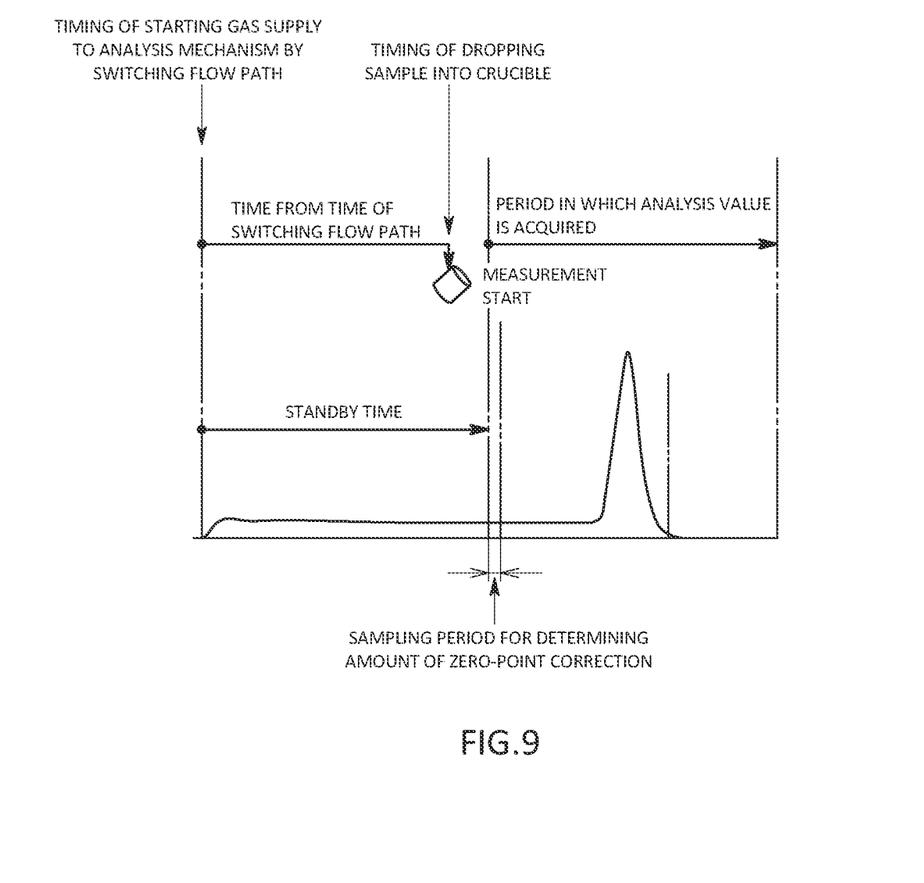
FIG. 9 is a schematic diagram illustrating an operation example and a change example of a measurement value from a start to an end of elemental analysis of an element analysis device in a conventional method.

Unfortunately, degassing is less likely to completely prevent the gas, which is not to be measured, from occurring from the crucible. Thus, even when a flow path is switched to allow a gas discharged from the heating furnace after completion of degassing to be introduced into the analysis mechanism from an exhaust flow path to transfer the processing to actual elemental analysis, a predetermined standby time is set to wait for stabilization of the amount of gas generated from the crucible by applying an electric current to only the crucible for a certain period of time as illustrated in FIG. 9. Then, after checking that the amount of element measured by the analysis mechanism rises from the switching of the flow path to result in stabilization at a substantially constant value, the sample is dropped into the crucible. Additionally, an average value of measurement values of the analysis mechanism after stabilization of the amount of gas that is not to be measured and is generated from the crucible is set as the amount of zero-point correction, and is used to perform the zero-point correction on the raw data. More specifically, although depending on combustion characteristics of the sample, an average value for ten seconds after waiting for a predetermined second after the sample is dropped is set as the amount of zero-point correction, for example.

Time required to stabilize the amount of gas that is not to be measured and generated from the crucible at a substantially constant value may be about one minute after completion of a transient state in which a measurement value rises, for example. For this reason, it takes time to start the actual analysis by dropping the sample into the crucible to generate the sample gas. Additionally, when the amount of generated gas that is not to be measured fluctuates in a time zone in which measurement values are sampled to calculate the amount of zero-point correction, the zero point varies to cause a decrease in analysis accuracy.

CITATION LIST

Patent Literature

Patent Literature 1: JP 4560058 B2

SUMMARY OF INVENTION

Technical Problem

The present invention is made in view of the above-described problems, and an object of the present invention is to provide an element analysis method capable of shortening time required for elemental analysis and maintaining accuracy of zero-point correction at a level equal to that in the related art.

Solution to Problem

Specifically, an element analysis method according to the present invention includes heating a sample placed in a crucible in a heating furnace, and measuring an amount of an element contained in a gas discharged from the heating furnace by an analysis mechanism to analyze the element contained in the sample, the method including: a blank measurement step of measuring the amount of the element contained in the gas discharged from the heating furnace when only the crucible is heated; and a zero-point correction amount setting step of setting an amount of zero-point correction based on a measurement value in a transient state region where the measurement value rises in blank data obtained in the blank measurement step.

An element analysis device according to the present invention includes a heating furnace in which a sample placed in a crucible is heated, and an analysis mechanism that measures an amount of an element contained in a gas discharged from the heating furnace to analyze the element contained in the sample, the device including: a blank measurement result storage unit that stores blank data including the amount of the element contained in the gas discharged from the heating furnace measured by the analysis mechanism when only the crucible is heated; and a zero-point corrector that sets an amount of zero-point correction based on a measurement value of a transient state region where the measurement value rises in the blank data.

This kind of method causes the amount of zero-point correction to be set based on the measurement value in the transient state region, and thus does not require waiting until the measurement value of the blank data becomes stable at a substantially constant value as in a conventional method. This method enables obtaining data necessary for determining the amount of zero-point correction in a shorter time than before. This method allows the amount of zero-point correction to be set based on a reference as in the blank measurement step even in a sample measurement step in which the sample is actually dropped into the crucible, and thus enabling a start time of generating a sample gas to advance by dropping the sample into the crucible without waiting until the measurement value becomes stable at a substantially constant value. Thus, time required for the entire elemental analysis can be significantly shortened.

Diligent study of the inventors of the present application first reveals that analysis accuracy has little difference between when the amount of zero-point correction is determined by a measurement value in a transient state region and when the amount of zero-point correction is determined by a measurement value in a state in which the amount of zero-point correction is stable at a substantially constant value as in the related art. That is, the conventional technical common sense causes consideration in which the amount of gas that is not to be measured and is generated from the crucible is unstable in a transient state, and thus the amount of zero-point correction varies for each analysis to deteriorate analysis accuracy greatly. However, a waveform in the transient state region has a substantially similar shape for each analysis in practice even when measurement values vary in magnitude for each analysis in the transient state, and thus has high reproducibility. This causes consideration in which the amount of zero-point correction determined by even a measurement value in the transient state region causes analysis accuracy equivalent to analysis accuracy using the amount of zero-point correction set by a measurement value in a stable state.

To set the amount of zero-point correction to a value close to the amount of zero-point correction set in a state where the analysis mechanism has substantially constant and stable measurement values as in the related art, the amount of zero-point correction may be set based on multiple measurement values in a gradient reduction region where a time derivative value of the measurement value tends to decrease in the transient state region.

Examples of the gradient reduction region in which the variation in the amount of zero-point correction can be reduced and the analysis accuracy can be improved include the gradient reduction region being a region between a time at which differential blank data obtained by applying time derivative to the blank data takes a peak value and a predetermined time.

For example, to enable the amount of zero-point correction for a measurement value of each element to be set to an appropriate value even when the element analysis device is configured to be able to analyze multiple kinds of element, the analysis mechanism may include multiple analysis devices provided in order from upstream to downstream on a discharge flow path through which gas is discharged from the heating furnace, and the amount of zero-point correction may be individually set in accordance with the gradient reduction region appearing at different timing for each analysis device.

The gradient reduction region appearing for the analyzer disposed on the most upstream side in the analysis mechanism is a region appearing in a time zone between seven seconds and twenty seconds inclusive from a measurement start time point of the blank data, and when the amount of zero-point correction is set from a measurement value in the region above, time during which the sample is dropped and actual analysis is started can be greatly shortened while achieving analysis accuracy equivalent to that in the related art.

The gradient reduction region appearing for the analyzer downstream of the analyzer disposed on the most upstream side can be defined as a region appearing after an elapse of a predetermined delay time with reference to the gradient reduction region appearing in the analyzer disposed on the most upstream side. For example, when a delay time is set in advance in accordance with time taken for reaching of the gas to be analyzed, the time depending on a separation distance between the corresponding analyzers and a volume of the analyzer or a flow rate, the gradient reduction region appearing in each analyzer can be defined based on the measurement start time point of the blank data and appearance timing of the gradient reduction region appearing in the analyzer on the most upstream side, and thus an appropriate amount of zero-point correction can be easily set for each analyzer.

Examples of a preferable definition of the gradient reduction region capable of maintaining analysis accuracy while shortening time required for the elemental analysis include a definition in which the gradient reduction region is a region from a time with a peak value to a time with a value decreasing to 10% of the peak value in differential blank data obtained by applying time derivative to the blank data.

To reduce influence of electrical noise or the like superimposed on the blank data and to cause an offset to be less likely to occur, the offset being caused by a change in the amount of gas that is not to be measured and is generated from the crucible, the amount of zero-point correction may be an average value of measurement values at four consecutive points in the gradient reduction region in the blank data. The measurement values at four points are likely to cancel an error between a plus direction and a minus direction of a vibration component like electrical noise, so that reproducibility of the amount of zero-point correction can be improved.

To enable shortening waiting time required for zero-point correction as compared with the related art even when elemental analysis is performed by dropping a sample into a crucible, the elemental analysis method further includes: a sample measurement step of measuring the amount of an element contained in gas discharged from the heating furnace when the crucible and the sample are heated; and a sample data generation step of setting the amount of zero-point correction based on a measurement value in a transient state region in which a measurement value rises in raw data obtained in the sample measurement step to calculate sample data in which the raw data is subjected to zero-point correction using the amount of zero-point correction.

To improve the accuracy of the elemental analysis by preventing measurement values of the analysis mechanism from being saturated by the gas generated from the crucible in the blank measurement step, the elemental analysis method may further include an empty baking step of heating only the crucible and exhausting the gas generated from the crucible to the exhaust flow path without introducing the gas into the analysis mechanism, and the blank measurement step may be started by switching an introduction destination of the gas generated from the crucible from the exhaust flow path to the analysis mechanism during the empty baking step or after the empty baking step is completed.

To enable an existing element analysis device to have an effect equivalent to that of the element analysis device according to the present invention by updating a program for the existing element analysis device, for example, the program is used in an element analysis device that includes a heating furnace in which a sample placed in a crucible is heated, and an analysis mechanism that measures an amount of an element contained in a gas discharged from the heating furnace to analyze the element contained in the sample, the program causing a computer to serve as: a blank measurement result storage unit that stores blank data including the amount of the element contained in the gas discharged from the heating furnace measured by the analysis mechanism when only the crucible is heated; a sample gas measurement result storage unit that stores raw data including the amount of the element contained in the gas discharged from the heating furnace measured by the analysis mechanism when the crucible and the sample are heated; and a zero-point corrector that calculates sample data by performing zero-point correction on the raw data, the zero-point corrector setting an amount of zero-point correction based on a measurement value in a transient state region in which a measurement value rises in the blank data.

The program for an element analysis device may be distributed electronically or may be recorded in a program recording medium such as a CD, a DVD, or a flash memory.

Advantageous Effects of Invention

As described above, the element analysis method according to the present invention causes the amount of zero-point correction to be set based on the measurement value in the transient state region in the blank data, and thus enables shortening waiting time greatly as compared with when the amount of zero-point correction is set after waiting until the state becomes stable as in the related art. Additionally, variation in the amount of zero-point correction and analysis accuracy can be maintained substantially equal to those of the conventional method.

REFERENCE SIGNS LIST

100 . . . element analysis device
3 heating furnace
AM analysis mechanism
C1 blank measurement result storage unit
C2 zero-point corrector
C3 sample gas measurement result storage unit
C4 input timing controller
C5 sample data storage unit
C6 element amount calculator

DESCRIPTION OF EMBODIMENTS

Figure 1:
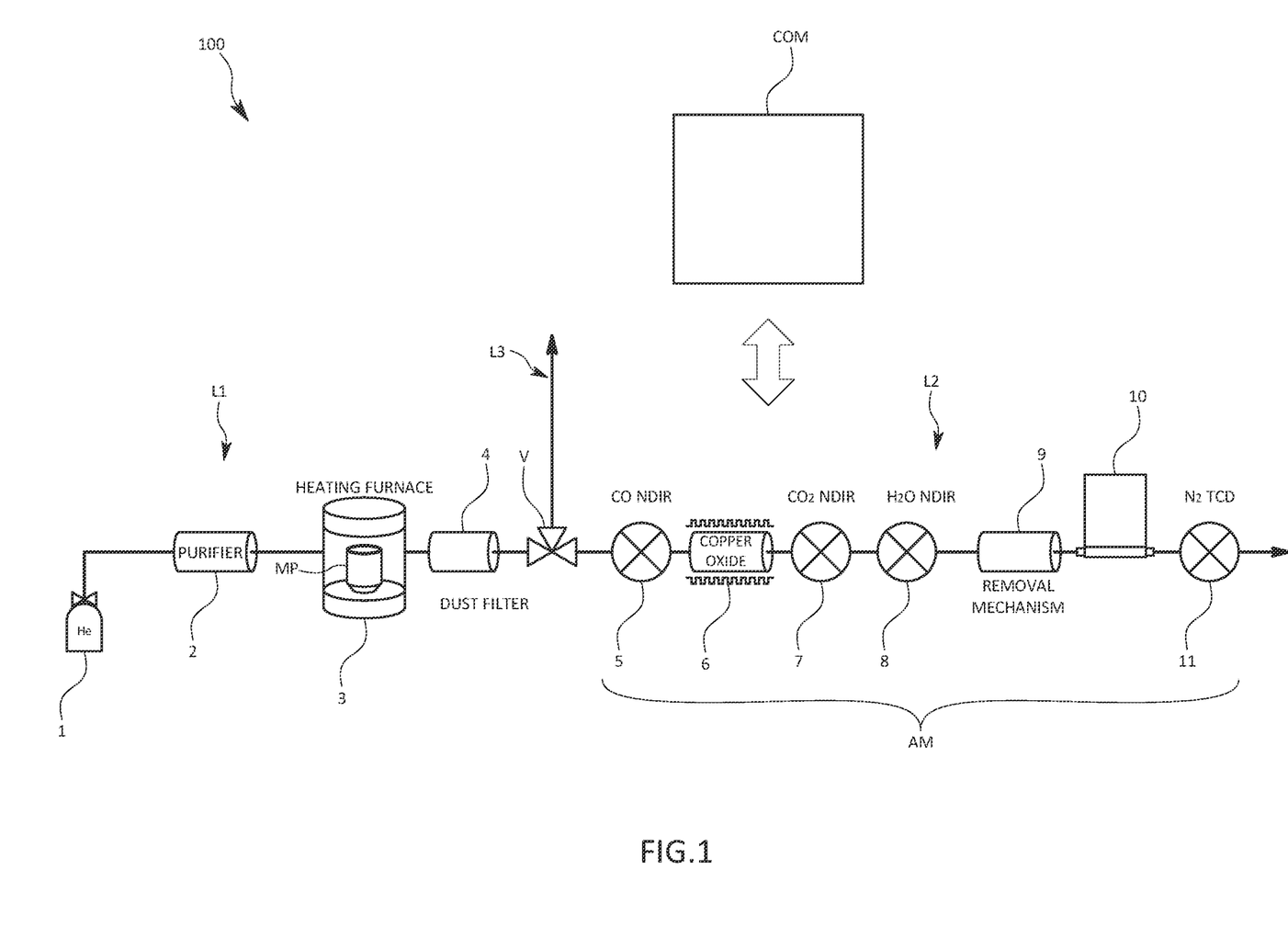
FIG. 1 is a schematic diagram illustrating a configuration of an element analysis device according to an embodiment of the present invention.

With reference to the drawings, an element analysis device 100 according to an embodiment of the present invention will be described. FIG. 1 illustrates an outline of the element analysis device 100 of the embodiment.

The element analysis device 100 heats and dissolves a metal sample or a ceramic sample (hereinafter, simply referred to as a sample), for example, contained in a graphite crucible MP, and analyzes a sample gas generated at that time to measure the amount of an element contained in the sample. The sample contains carbon (C), hydrogen (H), and nitrogen (N) that are to be measured in a first embodiment.

As illustrated in FIG. 1, the element analysis device 100 includes a heating furnace 3 in which a sample stored in the crucible MP is heated, an introduction flow path L1 for introducing a carrier gas into the heating furnace 3, a discharge flow path L2 for discharging a mixed gas of the carrier gas and the sample gas from the heating furnace 3, and an exhaust flow path L3 branching from a switching valve V provided between a dust filter 4 and an analysis mechanism AM in the discharge flow path L2. More specifically, the element analysis device 100 includes the heating furnace 3, each of devices provided in the introduction flow path L1 or the discharge flow path L2, and a control calculation mechanism COM that controls each of the devices and performs calculation processing of measured concentration and the like. The control calculation mechanism COM is a so-called computer including a CPU, a memory, an A/D converter, a D/A converter, and various input-output units, for example. The control calculation mechanism COM executes a program for an element analysis device stored in the memory to serve as each unit illustrated in the functional block diagram of FIG. 2 due to cooperation of various devices. The control calculation mechanism COM also serves as a display unit (not illustrated) that displays concentrations of various elements contained in the sample based on outputs of a CO detector 5, a $CO_2$ detector 7, an $H_2O$ detector 8, and an $N_2$ detector 11, which are analyzers constituting the analysis mechanism AM provided in the discharge flow path L2 and are to be described later, for example.

Each unit will be described in detail.

As illustrated in FIG. 1, the introduction flow path L1 is connected at its proximal end to a gas cylinder as a supply source 1 of a carrier gas. The supply source 1 supplies helium (He) into the introduction flow path L1 in the first embodiment. The introduction flow path L1 is provided with a purifier 2 that removes a minute amount of hydrocarbon contained in the carrier gas to increase purity of the carrier gas.

The purifier 2 is made of a material having characteristics of physically adsorbing hydrocarbons contained in the carrier gas and not substantially adsorbing the carrier gas itself. The material forming the purifier 2 does not chemically react with the carrier gas or the hydrocarbons. That is, the purifier 2 is also used in a gas chromatograph, for example, and a zeolite-based molecular sieve can be used as a material for forming the purifier 2, for example. The material forming the purifier 2 may be silica gel, activated carbon, ascarite, or the like. The purifier 2 can desorb adsorbed molecules by, for example, heating and regenerate its adsorption capacity.

The heating furnace 3 is configured to hold the graphite crucible MP containing a sample with a pair of electrodes to heat the crucible MP and the sample by applying an electric current directly to the crucible MP. When the sample is heated, a pressure adjusting valve (not illustrated) provided upstream of the heating furnace 3 adjusts pressure of the carrier gas to set pressure in the heating furnace 3 to be a pressure of 60 kPa or less, more preferably a pressure of 40 kPa or less.

Next, each device provided in the discharge flow path L2 will be described.

The discharge flow path L2 is provided with the dust filter 4, the switching valve V, the CO detector 5, an oxidizer 6, the $CO_2$ detector 7, the $H_2O$ detector 8, a removal mechanism 9, a mass flow controller 10, and the $N_2$ detector 11 as a thermal conductivity analyzer, which are aligned in this order from upstream. Each device other than the dust filter 4 and the switching valve V provided in the discharge flow path L2 constitutes the analysis mechanism AM that measures the amounts of nitrogen, hydrogen, and oxygen, which are elements to be analyzed, in this embodiment. That is, the analysis mechanism AM includes multiple analyzers from upstream to downstream in the discharge flow path L2, and an individual amount of zero-point correction is set for each of the analyzers.

The dust filter 4 filters and removes soot and the like contained in the gas discharged from the heating furnace 3.

The switching valve V is a so-called three-way valve, and the control calculation mechanism COM, for example, controls switching of connection directions of the switching valve V. The switching valve V switches flow paths to allow the gas discharged from the heating furnace 3 to flow to any one of the exhaust flow path L3 and the analysis mechanism AM provided downstream of the switching valve V in the discharge flow path L2. More specifically, while only the crucible MP is disposed and empty-baked in the heating furnace 3 to cause a component at high concentration to be extracted from the crucible MP, a generated gas is caused to flow to the exhaust flow path L3. The high concentration here means a state where measurement values of the analysis mechanism AM are saturated or almost saturated. In a time period during which the component at high concentration is extracted from the crucible MP, the discharge flow path L2 upstream from the switching valve V communicates with the exhaust flow path L3, and the discharge flow path L2 close to the analysis mechanism AM is closed.

At the time point when only a component at low concentration is extracted from the crucible MP as the empty baking of the crucible MP proceeds sufficiently, the switching valve V is switched to allow the gas discharge from the heating furnace 3 to be introduced into the analysis mechanism AM. After an elapse of a predetermined time from the switching of the switching valve V, a measurement value of the analysis mechanism AM rises from a value of zero.

The CO detector 5 includes a non-dispersive infrared gas analyzer (NDIR) to detect carbon monoxide (CO) contained in a mixed gas having passed through the dust filter 4 and measure concentration of the CO. The CO detector 5 operates effectively when oxygen contained in the sample has a high concentration due to its measurement accuracy. Specifically, CO of 150 ppm or more is preferably measured.

The oxidizer 6 oxidizes CO and $CO_2$ contained in the mixed gas having passed through the CO detector 5 and oxidizes $H_2$ into $H_2O$ (water) to generate water vapor. The oxidizer 6 is made of copper oxide in the first embodiment, and is maintained at a temperature of 450° C. or lower by a heat generating resistor provided around the oxidizer 6.

The $CO_2$ detector 7 is a NDIR that detects $CO_2$ in the mixed gas having passed through the oxidizer 6 and measures concentration of the $CO_2$. The $CO_2$ detector 7 operates effectively when oxygen contained in the sample has a low concentration (e.g., less than 150 ppm) from the viewpoint of measurement accuracy.

The $H_2O$ detector 8 is an NDIR that detects $H_2O$ in the mixed gas having passed through the $CO_2$ detector 7 and measures concentration of the $H_2O$. The flow path from the oxidizer 6 to the $H_2O$ detector 8 is configured to maintain the mixed gas at a temperature of 100° C. or higher to allow the $H_2O$ to be maintained in a water vapor state. This configuration prevents a measurement error due to dew condensation from occurring in the $H_2O$ detector 8.

The removal mechanism 9 adsorbs and removes $CO_2$ and $H_2O$ contained in the mixed gas. The removal mechanism 9 is composed of an adsorbent, and the adsorbent is the same as that of the purifier 2 provided in the introduction flow path L1 described above, for example.

The mass flow controller 10 is a flow rate control device in which a flow rate sensor M1, a control valve M2, and a flow rate controller M3 are incorporated into one package. The mass flow controller 10 supplies a mixed gas maintained constantly at a set flow rate to the $N_2$ detector 11 provided downstream. This configuration enables the mixed gas in the $N_2$ detector 11 to be maintained at a value of pressure suitable for measurement even when the mixed gas fluctuates in pressure with the removal mechanism 9. The mass flow controller 10 in the first embodiment is configured to operate at a pressure lower than 60 kPa, for example, even at a differential pressure of 20 kPa between before and after operation of the removal mechanism 9, to enable the heating furnace 3 to be maintained at a pressure of 60 kPa.

The $N_2$ detector 11 is a thermal conductivity detector (TCD), and measures concentration of $N_2$, which is a predetermined component contained in the mixed gas, from change in thermal conductivity of the mixed gas and a flow rate of the supplied mixed gas. That is, the mixed gas supplied to the $N_2$ detector 11 is substantially composed of only the carrier gas and $N_2$, so that the $N_2$ contained in the mixed gas has concentration with a value corresponding to the change in the measured thermal conductivity. The $N_2$ detector 11 in the first embodiment is provided downstream with no flow meter, and is connected downstream directly to an exhaust port of the discharge flow path L2.

Figure 2:
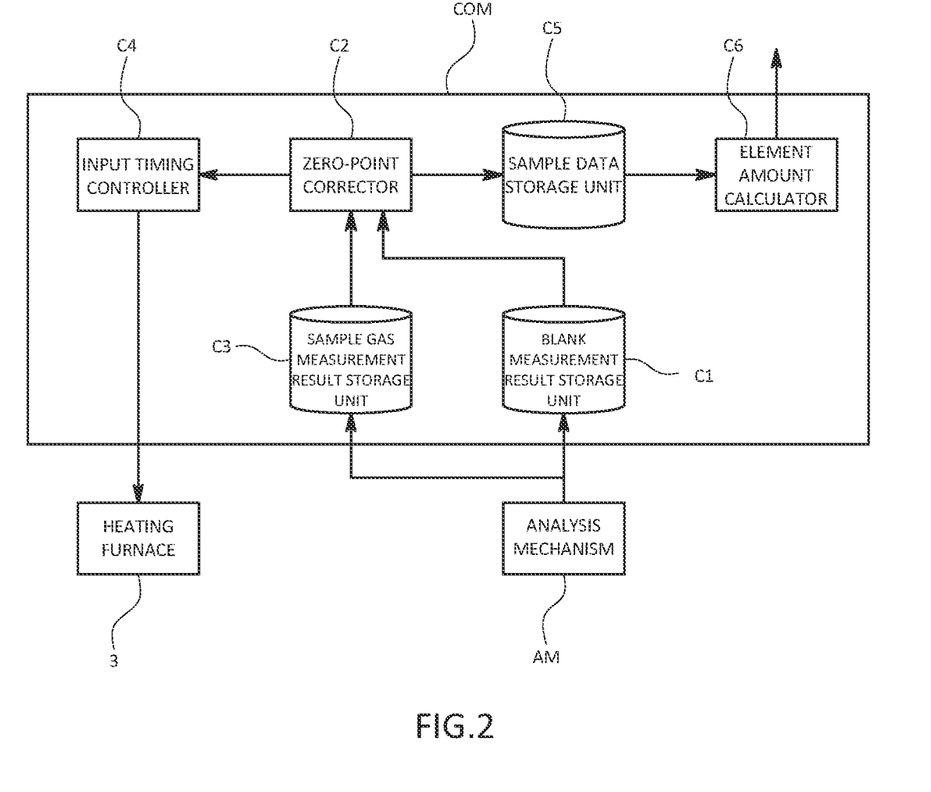
FIG. 2 is a functional block diagram of the element analysis device according to the embodiment.

Next, details of the control calculation mechanism COM will be described. As illustrated in FIG. 2, the control calculation mechanism COM serves as at least a blank measurement result storage unit C1, a sample gas measurement result storage unit C3, a zero-point corrector C2, a sample data storage unit C5, an input timing controller C4, and an element amount calculator C6. Configurations of these units will be described together with operation from a start to an end of analysis.

The element analysis device 100 of the present embodiment performs elemental analysis including at least three steps of an empty baking step, a blank measurement step, and a sample measurement step, for example.

The empty baking step is configured such that the crucible MP is empty-baked, and a component at high concentration derived from the crucible MP is discharged from the heating furnace 3 and exhausted from the exhaust flow path L3. During the empty baking step, the gas discharged from the heating furnace 3 is prevented from being introduced into the analysis mechanism AM by the switching valve V.

The blank measurement step is started at a time point when only a component at a low concentration is extracted from the crucible MP after the empty baking step is started. More specifically, the blank measurement step is started when a flow direction of the gas discharged from the heating furnace 3 is switched from a direction to the exhaust flow path L3 to a direction toward the analysis mechanism AM after an elapse of a predetermined time from the start of the empty baking step. The switching timing from the empty baking step to the blank measurement step may be determined based on an actually measured elapsed time by acquiring an elapsed time, at which only a component at a predetermined concentration or less is extracted from the crucible MP, in advance by an experiment or the like, for example. The blank measurement result storage unit C1 in this blank measurement step stores blank data that is time-series data including measurement values obtained from the CO detector 5, the $CO_2$ detector 7, the $H_2O$ detector 8, and the $N_2$ detector 11, which are the analyzers of the analysis mechanism AM, and the amount of zero-point correction of a measurement value is set based on the blank data. Each blank data here has a measurement start time point set as a time point at which the exhaust flow channel L3 is switched to the analysis mechanism AM in the above description. Thus, the measurement value rises at the earliest time point in the blank measurement data output from the CO detector 5 on the most upstream side, and a rise in the blank data of each analyzer provided downstream is delayed in accordance with a separation distance from the CO detector 5 on the most upstream side and volume of devices or flow paths provided up to the CO detector 5.

Figure 3:
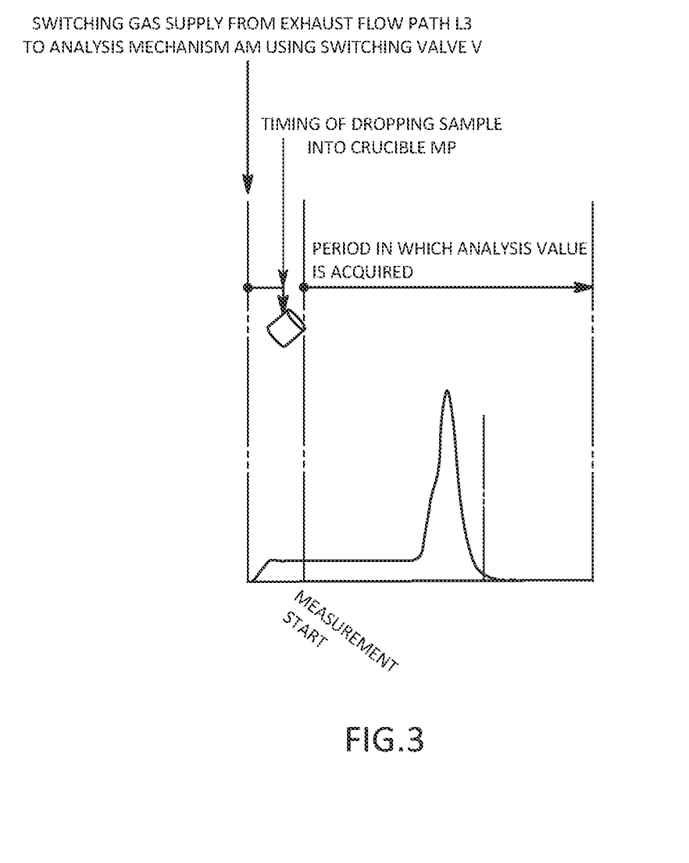
FIG. 3 is a schematic diagram illustrating an operation example and a change example of a measurement value from a start to an end of elemental analysis of the element analysis device according to the embodiment.

After the blank measurement step is completed, the crucible MP is taken out from the heating furnace 3, and another crucible MP is set. This new crucible MP is subjected to the above-described empty baking step, and the sample measurement step is started when only low-concentration components are extracted from the crucible MP. That is, when the direction of a flow of the gas discharged from the heating furnace 3 is switched from the direction to the exhaust flow channel L3 to the direction toward the analysis mechanism AM, the sample measurement step is also started. As illustrated in FIG. 3, the sample measurement step in the present embodiment is configured such that a sample is not dropped for a predetermined time after the direction of a flow of the gas is switched to the direction toward the analysis mechanism AM, and thus only the crucible MP is heated. Timing of dropping the sample may be appropriately changed depending on ease of combustion or melting of the sample. Measurement values obtained by the analysis mechanism AM in the sample measurement step are stored in the sample gas measurement result storage unit C3 as raw data, and are subjected to zero-point correction with the amount of zero-point correction set in the blank measurement step.

Next, setting of the amount of zero-point correction and the zero-point correction will be described in detail. The blank measurement step allows an electric current to be applied in a state where only the crucible MP is accommodated in the heating furnace 3 to heat only the crucible MP. Heating the crucible MP alone degasses nitrogen, hydrogen, oxygen, and the like present in the form of atmospheric components or compounds contained in the crucible MP to extract a small amount of gas that is not to be measured and is not derived from the sample. Then, the analysis mechanism AM measures the amount of each element contained in the gas that is not to be measured and is discharged from the heating furnace 3 to the discharge flow path L2, and the blank measurement result storage unit C1 stores the amount thereof as blank data.

The zero-point corrector C2 sets the amount of zero-point correction based on a measurement value in the transient state region where the measurement value rises in the blank data of analyzers corresponding to respective elements (nitrogen, hydrogen, oxygen). The amount of zero-point correction in this embodiment is set based on an average value of multiple measurement values in a gradient reduction region where a temporal change rate tends to decrease particularly in the transient state region. Timing at which the gradient reduction region appears earlier in the blank data output from each the analyzers for the analyzer provided on a more upstream side, so that the amount of zero-point correction is calculated separately based on a measurement value sampled in each individual gradient reduction region according to output of corresponding one of the analyzers.

Figure 4:
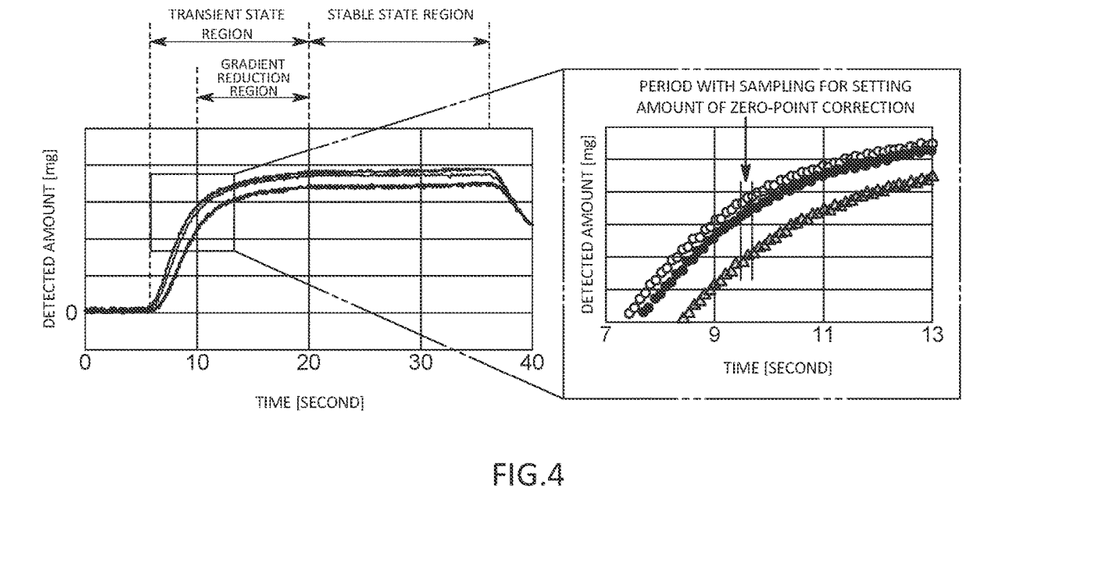
FIG. 4 is a graph showing a definition of each region of blank data and sampling points for calculating the amount of zero-point correction according to the embodiment.

To illustrate here a change tendency of the blank data, FIG. 4 illustrates a time change in the blank data for each of different crucibles MP in a case of waiting until the amount of generation of the gas that is not to be measured becomes stable as in a conventional case. Here, the blank data describes output from the CO detector 5 as an example. The graph used in the following description illustrates blank data output from the CO detector 5 as an example. As illustrated in FIG. 4, the switching valve V is switched to allow the gas discharged from the heating furnace 3 to flow from the exhaust flow path L3 to the analysis mechanism AM, and the analysis mechanism AM starts detecting an element after an elapse of a predetermined time (about 7 seconds in the graph) from the start of the blank measurement. Then, a transient state region is formed in which measurement values continue to monotonically increase during a predetermined period after the start of detection of an element. When the transient state region ends, a stable state region is formed in which measurement values are substantially constant. The stable state region can be defined as, for example, a region in which the most recent predetermined number of measurement values has a variation with respect to a moving average, the variation being a predetermined value or less. In contrast, the transient state region is other than the stable state region, and can be defined as a region in which measurement values change by a predetermined value or more after an elapse of a predetermined time after the switching valve V switches the flow path (after the start of the blank measurement step). As can be seen from each blank data in FIG. 4, each blank data different in absolute value shows a waveform of a schematic similar shape that can be regarded as a schematic first-order lag response. That is, FIG. 4 reveals that change tendencies are similar even when the amount of generation of gas that is not to be measured is different in magnitude for each crucible MP. The CO detector 5, the $CO_2$ detector 7, and the $H_2O$ detector 8 each output blank data causing a substantially identical waveform and having a similar tendency. Although the $N_2$ detector 11 outputs blank data causing a waveform different from those of other analyzers, the waveform similar in shape for each crucible MP can be obtained. The $CO_2$ detector 7, the $H_2O$ detector 8, and the $N_2$ detector 11 output the blank data in which each gradient reduction region appears, for example, in a time zone obtained by adding an individual delay time with respect to timing at which a gradient reduction region of the CO detector 5 appears.

Figure 5:
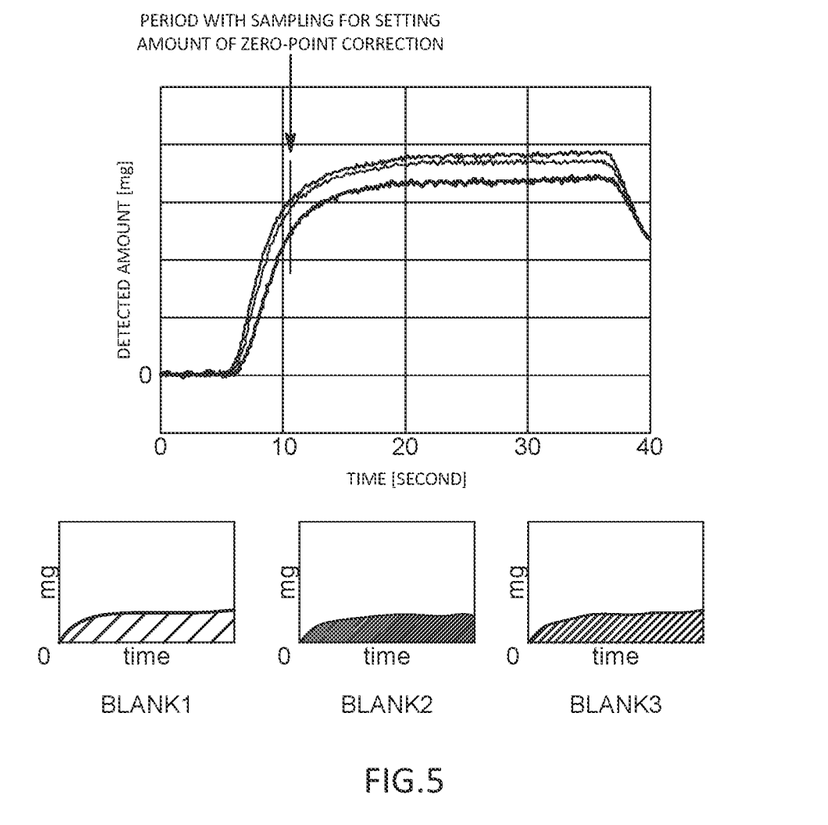
FIG. 5 is a graph showing a zero-point correction result for each of different crucibles according to the embodiment.

As illustrated in an enlarged part of FIG. 4, the zero-point corrector C2 in this embodiment sets an average value of measurement values of four consecutive points in the gradient reduction region as the amount of zero-point correction. The graph of FIG. 5 shows a result of setting the amount of zero-point correction and performing the zero-point correction on each blank data. As shown in the graph of FIG. 5, almost the same waveform is obtained after the zero-point correction in any blank data, and variations can be reduced to a predetermined value or less. That is, FIG. 5 reveals that the zero-point correction can be performed with sufficient accuracy for elemental analysis using multiple measurement values in the gradient reduction region in an earlier stage than the stable state region, without sampling measurement values in the stable state region and setting the amount of zero-point correction.

Figure 6:
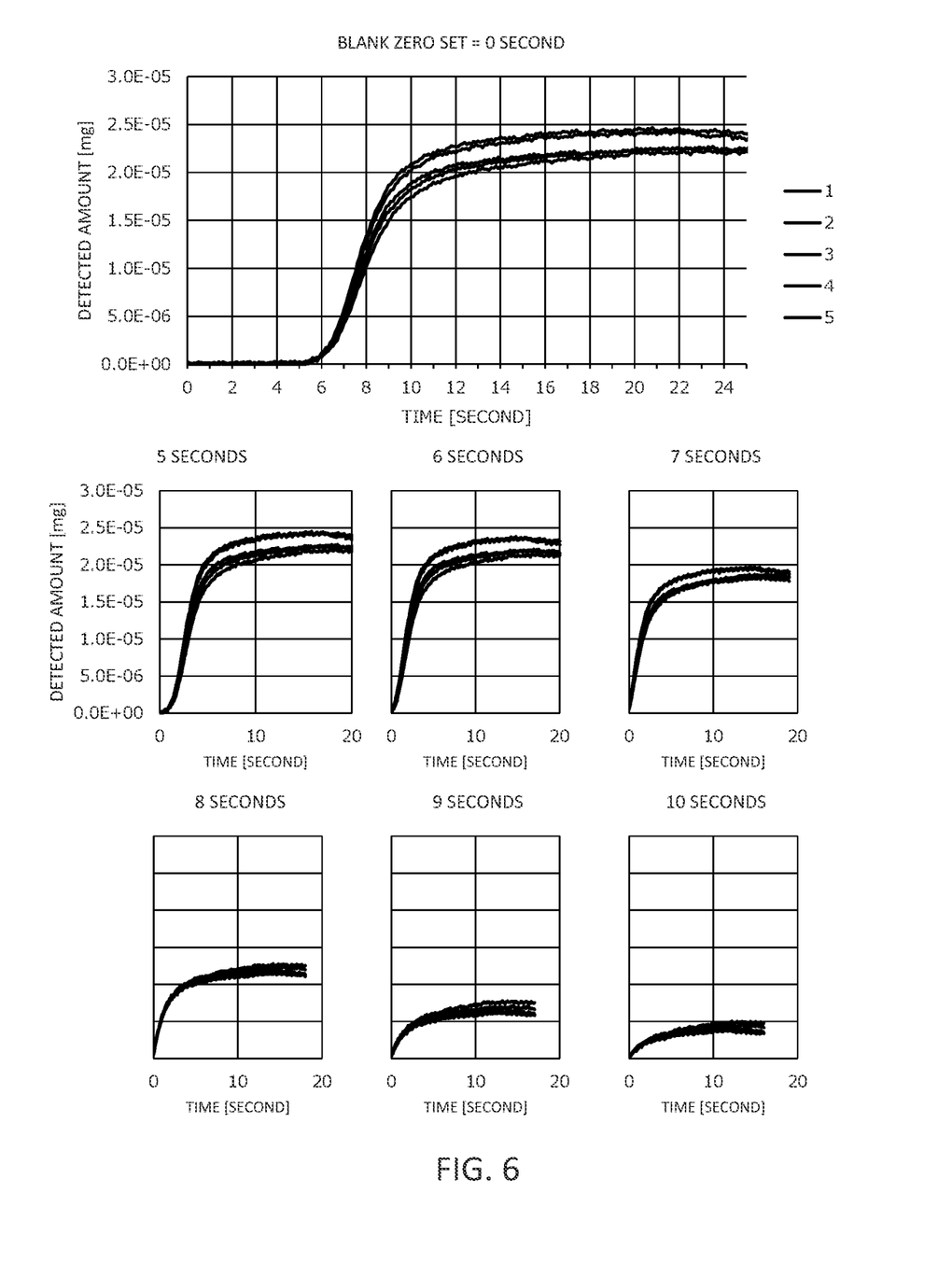
FIG. 6 is a graph showing a zero-point correction result for each zero set time according to the embodiment.
Figure 7:
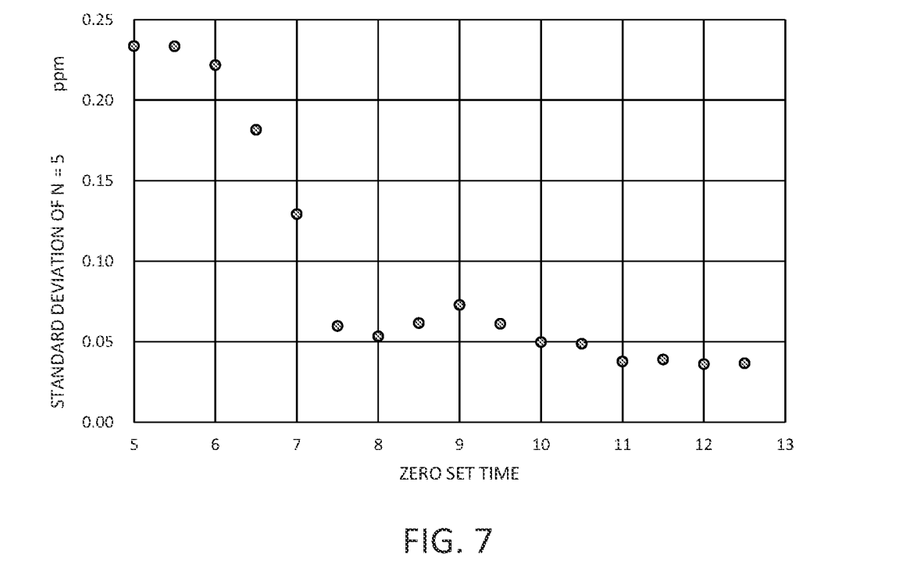
FIG. 7 is a graph showing a relationship between zero set time and variation of correction results according to the embodiment.
Figure 8:
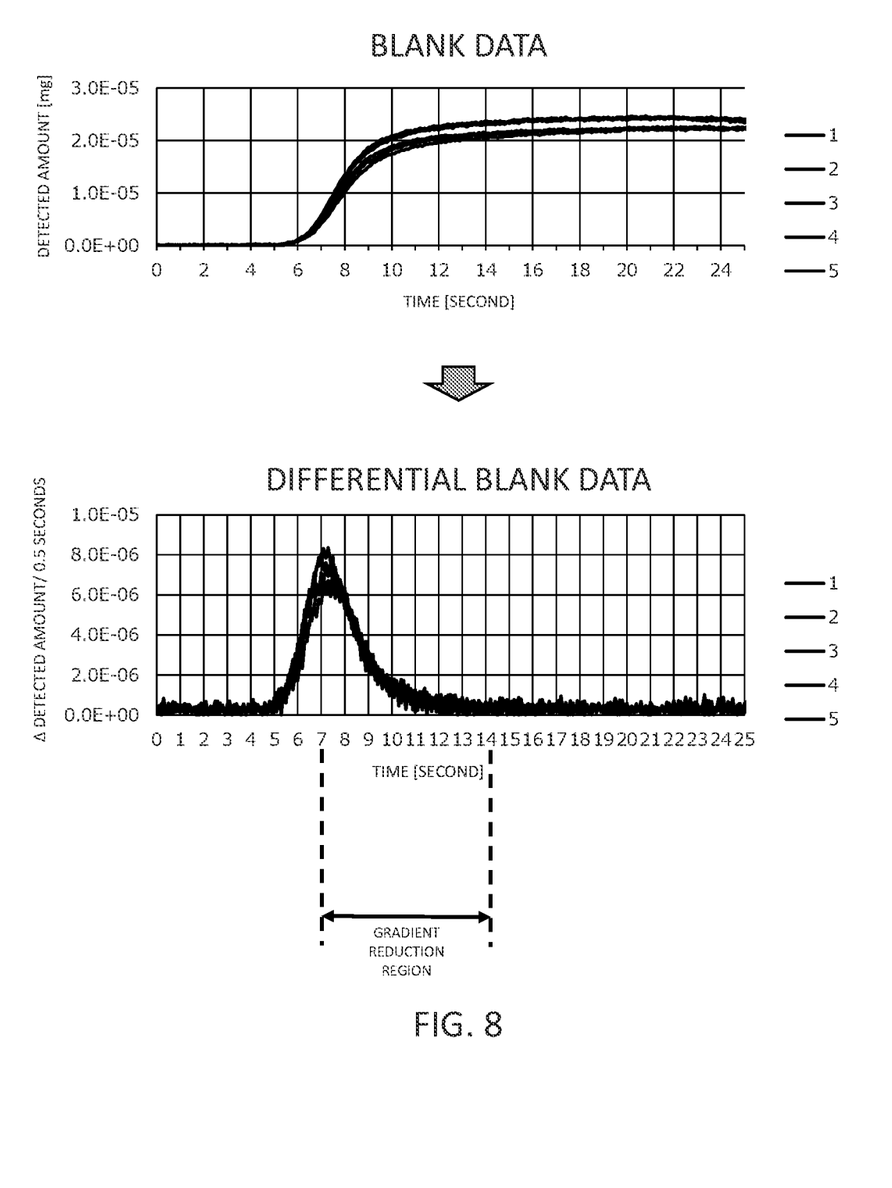
FIG. 8 is a graph showing differential blank data according to the embodiment.

Next, a relationship between sampling start timing of measurement values for setting the amount of zero-point correction in the transient state region and accuracy of the zero-point correction will be described. FIG. 6 illustrates blank data as an original and results of the zero-point correction of the blank data when a sampling start point for calculating the amount of zero-point correction is changed every second between five to ten seconds. As can be seen from each figure, when the sampling start point (zero set time) is changed, the variations tend to converge to be substantially constant after a predetermined time. More specifically, as can be seen from a relationship between zero set time and standard deviation indicating variation in corrected blank data, illustrated in FIG. 7, the variation is substantially constant after 7.5 seconds from a start of analysis (after a start of applying an electric current to the crucible MP). As can be seen from differential blank data obtained by applying time derivative to the blank data, illustrated in FIG. 8, 7.5 seconds is a time at which not only the differential blank data takes a peak value, but also the gradient reduction region starts. That is, when the amount of zero-point correction is set by selecting a measurement value from the blank data in a time zone of a region where the time differential value tends to decrease in the transient state region, the zero-point correction can be performed in which variations are reduced to a predetermined value or less.

The present embodiment defines the gradient reduction region in the blank data output from the CO detector 5 disposed on the most upstream side as a region appearing in a time zone between seven seconds and twenty seconds inclusive from a start time point of heating the crucible MP based on the analysis result as described above. In other words, the gradient reduction region can also be defined as a region from time at which the differential blank data obtained by applying time derivative to the blank data takes the peak value to time at which the differential blank data decreases to 10% of the peak value. When the zero-point corrector C2 samples measurement values at multiple points from the blank data, and sets an averaged amount of zero-point correction in the gradient reduction region defined as described above, the zero-point correction with variations reduced to a predetermined value or less can be achieved. The timing (zero set time) at which the zero-point corrector C2 samples measurement values for calculating the amount of zero-point correction may be manually set by a user at a predetermined time, or may be automatically set with a time at which the differential blank data takes an extreme value as a trigger. More specifically, the control calculation mechanism may further include a receiver that receives zero set time set by the user, and the zero-point corrector C2 may be configured to sample measurement values for calculating the amount of zero-point correction based on the zero set time received by the receiver. In this case, the zero-point corrector C2 may be configured such that a time zone is acquired by adding each individual delay time with reference to the received zero set time indicating a time zone in which the gradient reduction region of the CO detector 5 appears, and the time zone is extracted as the gradient reduction region in the blank data output from the $CO_2$ detector 7, the $H_2O$ detector 8, and the $N_2$ detector 11.

When the amount of zero-point correction for the blank data is set by the zero-point corrector C2, the zero-point corrector C2 stores a start point of a period for sampling for the zero-point correction from timing of switching a flow path as the zero set time to enable similar zero-point correction to be performed in a measurement step of a subsequent sample. Additionally, an integral value of the blank data subjected to the zero-point correction is stored in the zero-point corrector C2 as the amount of correction of the element extracted from the crucible MP.

Subsequently, when the sample measurement step is started after the crucible MP is replaced and empty baking is finished, a transient state region with a measurement value rising appears in raw data as illustrated in FIG. 2, as in the blank measurement step. The zero-point corrector C2 samples measurement values at four points from the raw data at the same timing as sampling timing for calculating the amount of zero-point correction in the stored blank data, and calculates the amount of zero-point correction for the raw data. The input timing controller C4 illustrated in FIG. 2 inputs a sample into the crucible MP at a predetermined input timing, and starts heating the sample. The sample input timing may be after an elapse of a predetermined number of seconds from the zero set time set in the zero-point corrector C2. The number of seconds may be appropriately set in consideration of ease of combustion of the sample. From the viewpoint of speeding up the elemental analysis, the sample may be dropped at the end of the transient state region or at the beginning of the stable state region in the raw data. As illustrated in FIG. 3, the sample in this embodiment is dropped immediately after the setting of the amount of zero-point correction of the raw data is completed.

The sample gas measurement result storage unit C3 illustrated in FIG. 2 stores the measurement value of each element at each time measured by the analysis mechanism AM after dropping of the sample as raw data for each element. The zero-point corrector C2 calculates sample data obtained by performing zero-point correction on the raw data of each element with the corresponding amount of zero-point correction, and stores the sample data in the sample data storage unit C5. Here, the zero-point correction is sequentially performed each time a new measurement value is acquired. The element amount calculator C6 illustrated in FIG. 2 calculates the amounts of elements of nitrogen, hydrogen, and oxygen contained in the sample before extraction of a sample gas based on each sample data. That is, the element amount calculator C6 calculates the sum of the amount of the element derived from the sample and the amount of the element derived from the crucible MP from an area value of the graph of the sample data, and calculates the amount of the element derived from the crucible MP from an area value of the graph of the blank data subjected to the zero-point correction with the amount of zero-point correction. The element amount calculator C6 sequentially calculates the amount of the element contained in the sample from these calculated amounts, and displays a value of the amount on a display, for example.

As described above, the element analysis device of the present embodiment sets the amount of zero-point correction based on the multiple measurement values in the gradient reduction region in the blank data as illustrated in FIG. 4, and does not require waiting for a long time without dropping a sample until the amount of generation of a gas that is not to be measured as in the related art, and thus enabling standby time to be greatly reduced. Additionally, the variation due to the zero-point correction can be reduced by using the measurement values in the gradient reduction region as can be seen from the analysis results of FIGS. 6 to 8, so that the analysis accuracy equivalent to that of the conventional method can be achieved.

The element analyzer of the present embodiment also narrows down the number of sampling points of the measurement values for calculating the amount of zero-point correction to four points, and thus enables electrical noise influence and the like to be reduced while allowing the variation in the zero-point correction to be less likely to occur by using even the measurement value in the gradient reduction region in which the measurement value itself may vary larger than noise as compared with that in the stable state region. That is, the number of sampling points is an even number, so that vibration of electrical noise can be canceled between a positive side and a negative side, and thus variation in the amount of zero-point correction can be reduced.

Other embodiments will be described.

Although the amount of zero-point correction is calculated using only a measurement value in the gradient reduction region in the above embodiment, the amount zero-point correction may be calculated including a measurement value in a region other than the gradient reduction region (e.g., a gradient increase region) in the transient state region depending on allowable analysis accuracy.

The zero set time for the zero-point corrector to calculate the amount of zero-point correction is as follows. The zero set time is not necessarily selected from the transient state region. For example, the zero-point corrector may be configured to calculate the amount of zero-point correction by sampling a measurement value from the transient state region when elemental analysis is desirably performed at a high speed, and calculate the amount of zero-point correction by sampling a measurement value from the stable state region in blank data when elemental analysis is performed in the same state as in the related art or when higher analysis accuracy is required.

The number of sampling points for calculating the amount of zero-point correction is not limited to four, and may be one, two, or three. The number of sampling points may be five or more.

The zero-point corrector is not limited to performing the zero-point correction every time a new measurement value is obtained in the sample measurement step, and may perform the zero-point correction on the entire raw data after every measurement is completed, for example.

The elements to be analyzed in the element analysis device are not limited to nitrogen, hydrogen, and oxygen, and at least one of these three elements may be analyzed, for example. Elements other than nitrogen, hydrogen, and oxygen may be analyzed.

The raw material of the crucible is not limited to graphite, and the crucible may be made of a material such as ceramics.

Additionally, various modifications of the embodiments and combinations of some of the embodiments may be made without departing from the spirit of the present invention.

INDUSTRIAL APPLICABILITY

The present invention enables providing an element analysis device in which a waiting time required to set the amount of zero-point correction can be significantly shortened, and a variation in the amount of zero-point correction and analysis accuracy are improved as compared with the related art.

The invention claimed is:

1. An element analysis method including heating a sample placed in a crucible in a heating furnace; and measuring an amount of an element contained in a gas discharged from the heating furnace by an analysis mechanism to analyze the element contained in the sample, the method comprising:
    a blank measurement step of measuring the amount of the element contained in the gas discharged from the heating furnace when only the crucible is heated, and
    a zero-point correction amount setting step of setting an amount of zero-point correction based on a measurement value in a transient state region where the measurement value rises in blank data obtained in the blank measurement step.

2. The element analysis method according to claim 1, wherein the amount of zero-point correction is set based on multiple measurement values in a gradient reduction region where a time derivative value of the measurement value tends to decrease in the transient state region.

3. The element analysis method according to claim 2, wherein the gradient reduction region is a region between a time at which differential blank data obtained by applying time derivative to the blank data takes a peak value and a predetermined time.

4. The element analysis device method according to claim 3, wherein
    the analysis mechanism includes multiple analysis devices provided in order from upstream to downstream on a discharge flow path through which gas is discharged from the heating furnace, and
    the amount of zero-point correction is individually set in accordance with the gradient reduction region appearing at different timing for each analysis device.

5. The element analysis method according to claim 3, wherein the gradient reduction region appearing for the analyzer disposed on the most upstream side in the analysis mechanism appears in a time zone between seven seconds and twenty seconds inclusive from a measurement start time point of the blank data.

6. The element analysis method according to claim 4, wherein the gradient reduction region appearing for the analyzer disposed downstream from the most upstream side is a region appearing after predetermined delay time elapses, taking the gradient reduction region appearing for the analyzer disposed on the most upstream side as a reference.

7. The element analysis method according to claim 2, wherein the gradient reduction region is a region from time at which the differential blank data obtained by applying time derivative to the blank data takes the peak value to time at which the differential blank data decreases to 10% of the peak value.

8. The element analysis method according to claim 2, wherein the amount of zero-point correction is an average value of measurement values at four consecutive points in the gradient reduction region in the blank data.

9. The element analysis method according to claim 1, further comprising:
    a sample measurement step of measuring the amount of an element contained in gas discharged from the heating furnace when the crucible and the sample are heated; and
    a sample data generation step of setting the amount of zero-point correction based on a measurement value in a transient state region in which a measurement value rises in raw data obtained in the sample measurement step to calculate sample data in which the raw data is subjected to zero-point correction using the amount of zero-point correction.

10. The element analysis method according to claim 1, further comprising an empty baking step of heating only the crucible and exhausting the gas generated from the crucible to the exhaust flow path without introducing the gas into the analysis mechanism, wherein the blank measurement step is started by switching an introduction destination of the gas generated from the crucible from the exhaust flow path to the analysis mechanism during the empty baking step or after the empty baking step is completed.

11. An element analysis device including a heating furnace in which a sample placed in a crucible is heated, and an analysis mechanism that measures an amount of an element contained in a gas discharged from the heating furnace to analyze the element contained in the sample, the device comprising:

a blank measurement result storage unit that configured to store blank data including the amount of the element contained in the gas discharged from the heating furnace measured by the analysis mechanism when only the crucible is heated; and a zero-point corrector that sets an amount of zero-point correction based on a measurement value of a transient state region where the measurement value rises in the blank data.

12. A non-transitory computer readable medium storing a program that is used in an element analysis device that includes a heating furnace in which a sample placed in a crucible is heated, and an analysis mechanism that measures an amount of an element contained in a gas discharged from the heating furnace to analyze the element contained in the sample, such that the non-transitory computer readable medium is programmed to perform:

a blank measurement step of measuring the amount of the element contained in the gas discharged from the heating furnace when only the crucible is heated, and a zero-point correction amount setting step of setting an amount of zero-point correction based on a measurement value in a transient state region where the measurement value rises in blank data obtained in the blank measurement step.

* * * * *